United States Patent
DeLuca et al.

(10) Patent No.: US 10,070,269 B1
(45) Date of Patent: Sep. 4, 2018

(54) FACILITY FOR PROXIMITY-BASED SHARING OF VENUE-SPECIFIC USER LOCATION DATA

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/430,893

(22) Filed: Feb. 13, 2017

(51) Int. Cl.
  *H04W 4/021* (2018.01)
  *H04W 4/029* (2018.01)
  *H04W 4/04* (2009.01)
  *H04W 4/02* (2018.01)

(52) U.S. Cl.
  CPC ........... *H04W 4/043* (2013.01); *H04W 4/021* (2013.01); *H04W 4/028* (2013.01); *H04W 4/029* (2018.02)

(58) Field of Classification Search
  CPC ..... H04W 4/021; H04W 4/043; H04W 4/029; H04W 4/028
  USPC .............................................. 455/456.1–457
  See application file for complete search history.

(56) References Cited

U.S. PATENT DOCUMENTS

| | | | |
|---|---|---|---|
| 9,351,114 B2 | 5/2016 | Chatterjee et al. | |
| 9,949,090 B2 * | 4/2018 | Hong | H04W 4/023 |
| 2005/0143097 A1 * | 6/2005 | Wilson | H04W 64/00 455/456.3 |
| 2008/0238659 A1 * | 10/2008 | Houde | G08B 25/016 340/539.13 |
| 2010/0004854 A1 * | 1/2010 | Shin | G01C 21/3415 701/533 |
| 2012/0165035 A1 * | 6/2012 | Chen | H04L 51/20 455/456.1 |
| 2013/0096813 A1 * | 4/2013 | Geffner | H04W 4/003 701/117 |
| 2013/0324166 A1 | 12/2013 | Mian et al. | |
| 2015/0111524 A1 * | 4/2015 | South | H04W 4/22 455/404.2 |

(Continued)

OTHER PUBLICATIONS

Mel et al., "The NIST Definition of Cloud Computing," National Institute of Standards and Technology, Information Technology Laboratory, Special Publication 800-145, Sep. 2011, (pp. 1-7).

(Continued)

*Primary Examiner* — Marisol Figueroa
(74) *Attorney, Agent, or Firm* — Michael A. Petrocelli, Esq.; Kevin P. Radigan, Esq.; Heslin, Rothenberg, Farley & Mesiti, P.C.

(57) ABSTRACT

Proximity-based sharing of venue-specific user location data is provided. The method includes, for instance, processing, in association with a locate facility, a request by one user that an other user meet the one user at a venue. In addition, a geo-fence is established relative to, at least in part, the venue, and based on the other user crossing the geo-fence, the method includes providing, via the locate facility, venue-specific location data on the one user's location within the venue to a mobile device of the other user to assist the other user in locating the one user within the venue.

20 Claims, 9 Drawing Sheets

(56) References Cited

U.S. PATENT DOCUMENTS

2015/0382144 A1* 12/2015 Lopez .................. H04W 4/023
455/456.2

OTHER PUBLICATIONS

International Business Machines Corporation (IBM), "z/Architecture Principles of Operation," IBM® Publication No. SA22-7832-10, Eleventh Edition, Mar. 2015, pp. 1-1732.
International Business Machines Corporation (IBM), "Power ISA™ Version 2.07B," International Business Machines Corporation, Apr. 9, 2015, pp. 1-1527.
Anonymous, "System and Method for Path Formulation and Reduced Resource Consumption based on Macro and Micro Location Services", IP.com No. IPCOM000246007D, dated Apr. 26, 2016 (3 pages).

* cited by examiner

FACILITY FOR PROXIMITY-BASED SHARING OF VENUE-SPECIFIC USER LOCATION DATA

BACKGROUND

There currently exist a variety of portable computing devices (i.e., mobile devices), including wireless computing devices, such as mobile telephones, personal digital assistants (PDAs), tablets, laptop computers, wireless computers, etc., which are small, lightweight and easily carried by users. These mobile devices (including cellular phones, internet protocol (IP) telephones, smartphone devices, etc.) can communicate audio and data packets over wireless networks. In addition, mobile devices may possess facilities which allow for the tracking of the devices, such as by using the Global Positioning System (GPS). Depending on the implementation, a tremendous amount of data may be generated in monitoring multiple peoples location in real-time.

SUMMARY

Certain shortcomings of the prior art are overcome and additional advantages are provided through the provision of a computer-implemented method which includes, for instance, processing, in association with a locate facility, a request by one user that an other user meet the one user at a venue. In addition, the computer-implemented method includes establishing a geo-fence relative to, at least in part, the venue; and based on the other user crossing the geo-fence, providing via the locate facility, venue-specific location data on the one user's location within the venue to a mobile device of the other user.

In another aspect, a system is provided which includes a memory, and a processing unit communicatively coupled to the memory. This system performs a method which includes processing, in association with a locate facility, a request by one user that an other user meet the one user at a venue. Further, the method includes establishing a geo-fence relative to, at least in part, the venue, and based on the other user crossing the geo-fence, providing via the locate facility, venue-specific location data on the one user's location within the venue to a mobile device of the other user.

In a further aspect, a computer program product is provided for facilitating proximity-based sharing of venue-specific user location data. The computer program product includes a computer readable storage medium having computer readable code embodied therewith. The computer readable program code is executable by a processor to perform a method, including processing, in association with a locate facility, a request by one user that an other user meet the one user at a venue. Further, the method includes establishing a geo-fence relative to, at least in part, the venue, and based on the other user crossing the geo-fence, providing via the locate facility, venue-specific location data on the one user's location within the venue to a mobile device of the other user.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
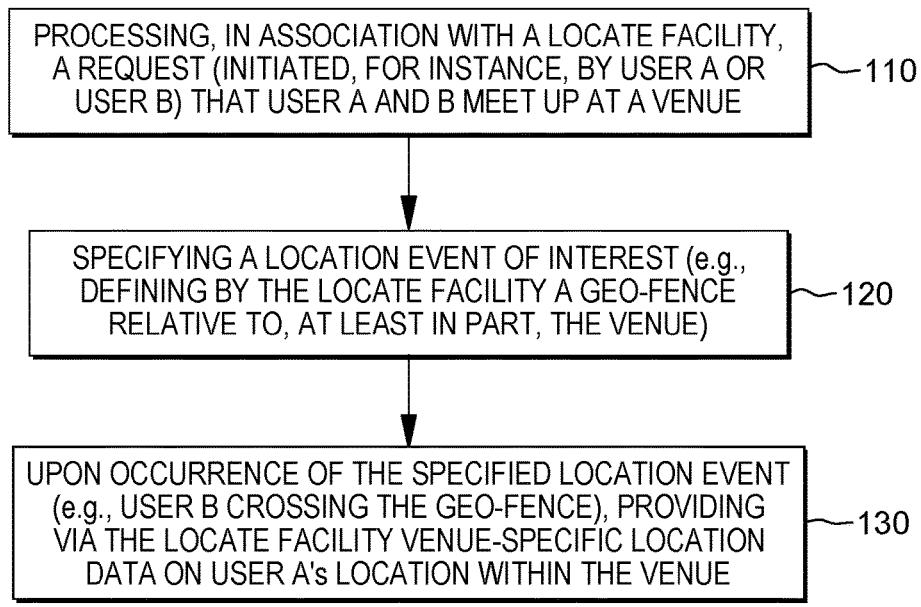
FIG. 1 depicts one embodiment of proximity-based sharing of venue-specific user location data (i.e., micro-location data), in accordance with one or more aspects of the present invention.

The description that follows includes exemplary devices, systems, methods, techniques and instruction sequences that embody techniques of the present invention. However, it should be understood that the described invention may be practiced, in one or more aspects, without the specified details. In other instances, known protocols, structures and techniques have not been shown in detail in order not to obscure the invention. Those of ordinary skill in the art will appreciate that the described techniques and mechanisms may be applied to various systems to facilitate processing, in accordance with one or more aspects of the present invention.

Indoor mobile device location services are available which allow for individuals to be tracked inside of a venue. For instance, an individual may be monitored within a venue using video monitoring and facial recognition to generate location data on particular individuals within a venue. As another example, mobile devices carried by individuals moving within a venue may be tracked. For instance, as a mobile device enters a venue, a record may be saved with the mobile device's visit information including, for instance, time of day, travel path through the venue and dwell times within the venue. In a potentially large venue, such as a retail store, a stadium, an office building, etc., hundreds if not thousands of individuals or their mobile devices could potentially be tracked at any given moment. These various location monitoring technologies are referred to herein as a user tracking technology implemented in association with or within a venue. As described further herein, in one or more embodiments, the user tracking technology implemented within the venue is one or more non-GPS based tracking technologies.

By way of further example, a "venue" may include any indoor or outdoor location that may be configured with cameras and/or short-distance wireless device location detection technology (e.g., Bluetooth' Low Energy (BLE), or other hot spot beacons, triangulation, proximity, etc.), such as a sports arena, a store, office building or any other building, shopping mall, food court, or other indoor or outdoor geographic area where people may gather and move among different locations within the area.

A venue "zone" may include any area or region of a venue, such as a food court/cafeteria, a floor and/or section of a store, a region of a shopping mall, or sports stadium, or other area/region that may be configured with technology (such as short distance wireless device location detection technology) to detect movement among and within the respective areas or regions. In this context, a venue "zone event" may refer (in one or more examples) to detection of a mobile device, and thereby the respective user carrying the mobile device, entering, moving within, dwelling at a location within, or leaving a particular venue zone.

Multiple different forms of zone events may be configured as granularly as appropriate for a particular venue and zone, according to size and other factors relating to the particular venue and zone. The term "dwell" may refer to a user of a mobile device being detected as being within a particular location or zone.

In one or more implementations, multiple individuals within a venue may be tracked (e.g., via the individuals' mobile devices), with zone events occurring that represent relative movements and dwell patterns of the individuals within the venue as the individuals move and dwell among multiple configured zones of the venue. This information may then be collected and used, for instance, by a locate facility such as described herein to implement proximity-based sharing of venue-specific user location data upon occurrence of a location event.

By way of example, location data may be detectable on mobile device users as they enter, exit, and remain within one or more zones within a venue, to determine at any given time, location of the mobile device users. It should also be noted in this discussion that the owners of the mobile devices may be provided with an opportunity to "opt in" to or "opt out" from the venue-based location tracking technology described herein.

In general, location services within a venue are enabling people to have a better indoor navigation experience in many instances. With technology such as BLE beacons, Wi-Fi triangulation, video monitoring, etc., services such as International Business Machines Corporation's Presence Insights™ can use this information to determine where a particular individual is located within a venue (i.e., the individual's micro-location or venue-specific location). An issue with such a facility is that there is a tremendous amount of data that may be fed into the system in order to keep track of multiple people within a venue in real-time. Disclosed herein therefore, in one or more aspects, is preventing the sharing of constant location updates on one person's location within a venue until another person is triggered to receive them.

Generally stated, computer-implemented methods, systems and computer programs product are presented for proximity-based sharing of venue-specific location data. In one or more implementations, the methods, systems and computer program products are implemented by, or in association with a locate facility, which (by way of example) may be provided as a cloud based service. For instance, in one or more implementations, the locate facility could be provided as an extension onto an existing cloud based service such as International Business Machine Corporation's Presence Insights™ facility. IBM Presence Insights™ is a facility that, in part, aggregates location and location-related metadata to build context that can be used for analysis and resulting actions. As such, part of the value that Presence Insights™ provides is its ability to provide location information to its users.

Referring to FIG. 1, one embodiment of a method, generally denoted 100, in accordance with one or more aspects of the present invention is illustrated. Method 100 includes, by way of example, processing, in association with a locate facility, a request (initiated, for instance, by user A or user B) that user B and user A meet up at a venue 110. As explained herein, the locate facility may be, in or more implementations, a cloud-based service which provides or accumulates venue-specific location data on one or more users within a venue. The venue-specific location data, or micro-location data, may be accumulated using user tracker technology implemented in association with the venue that is, for instance, non-GPS based. For instance, Wi-Fi triangulation, beacons, radio frequency identification, video tracking, etc., technologies discussed herein may be employed. Additionally, the method includes specifying a location event of interest 120. This location event of interest may be, for instance, defining by the locate facility a geo-fence relative to, at least in part, the venue. For instance, the geo-fence may be defined as a boundary encircling the venue, either out from the venue, or, for instance, at a perimeter of the venue (in one or more implementations). In operation, after user A or user B initiates a request to meet up at the venue, user B (and user A) travel to meet up at the venue, and in the course of traveling, user B (by way of example) satisfies the location event of interest (e.g., crosses the geo-fence). Upon occurrence of the specified location event (e.g., user B crossing the geo-fence), the method includes providing via the locate facility venue-specific location data on user A's location within the venue 130. In one or more implementations, this venue-specific location data may be current micro-location data on user A's location at the time that user B crosses the geo-fence. Further, providing the venue-specific location data may include forwarding the venue-specific location data on user A's location within the venue to a mobile device of user B.

The computer-implemented methods, systems and computer program products disclosed herein may be proximity based, in that user B is presented with venue-specific location data on user A's location within the venue only after triggering a specified location event, such as user B crossing a geo-fence defined relative to, for instance, the venue by the locate facility. Advantageously, the proximity-based sharing of venue-specific user location data reduces the amount of location data reported to user B's mobile device. For instance, user B's mobile device only receives venue-based location data on user A once user B is close to the venue. In this way, movement data and prior location data on user A within the venue is not transferred to user B. This advantageously results in less bandwidth, as well as less data and push notifications being sent to and between the users.

Further, greater security is enabled to prevent a user from knowing too much location information when it is not required in order to facilitate, for example, user B meeting user A within the venue. Further, the users' mobile device batteries are advantageously saved due to the lower transmission amounts. The facility disclosed herein provides competitive advantage and may be implemented, for instance, as an extension onto existing services, such as the International Business Machine Corporation's Presence Insight™ service. Note, however, that in one or more other implementations, the facility (or locate facility) disclosed may be other than a cloud-based service. For instance, the facility could be implemented at the venue where users A and B are meeting, or even in association with one or more of the users' mobile devices.

Figure 2A:
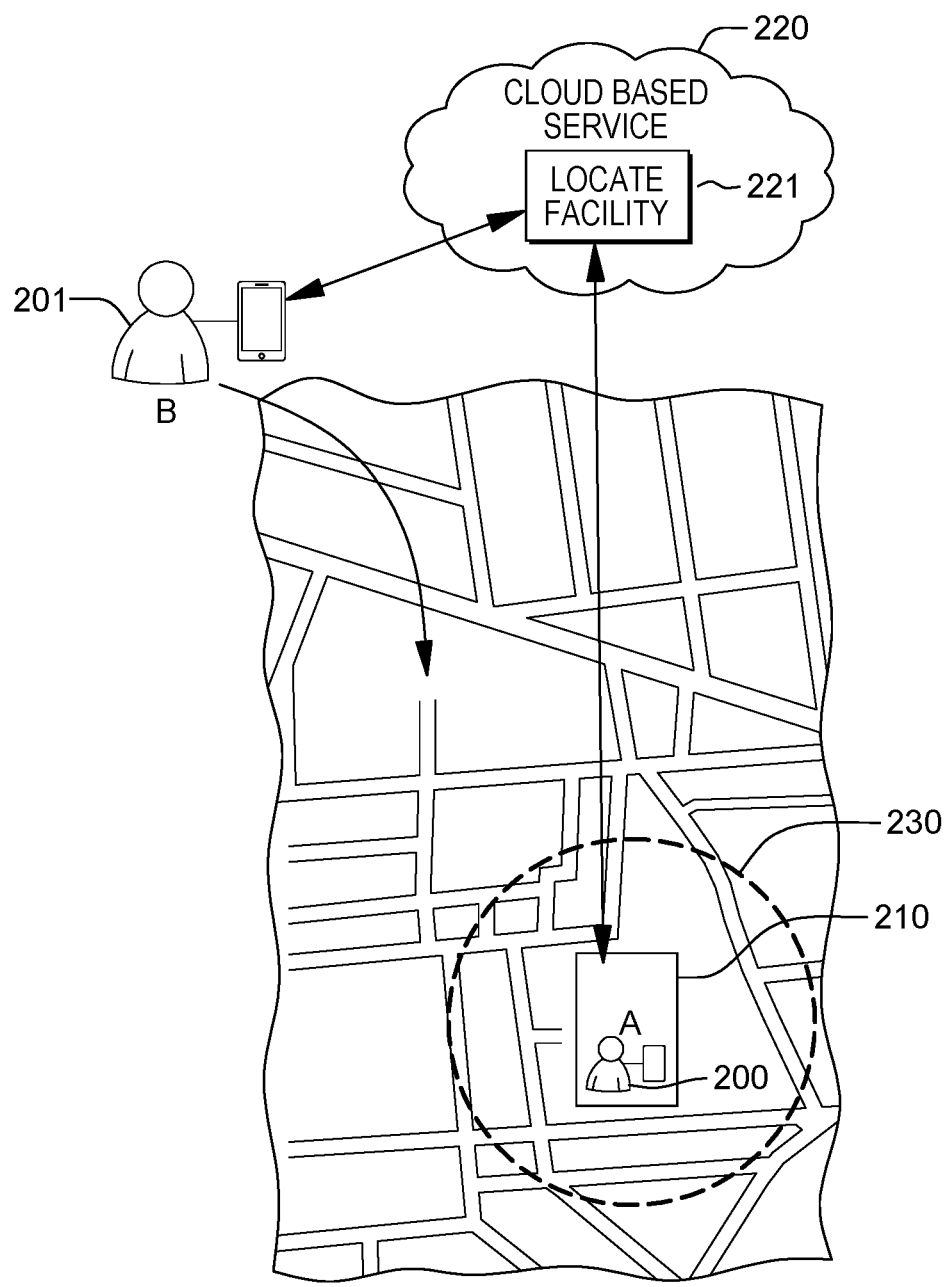
FIG. 2A depicts an operational example using a locate facility for providing proximity-based, venue-specific user location data, in accordance with one or more aspects of the present invention.
Figure 2B:
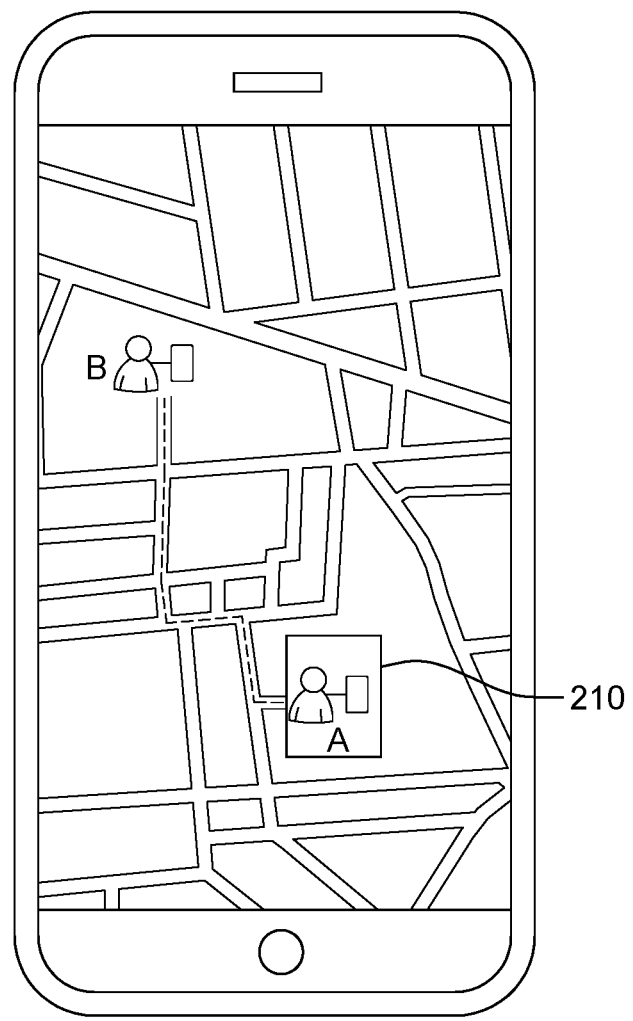
FIG. 2B depicts a mobile device display where location data provided by, for instance, the locate facility of FIG. 2A, is used by user B, along with global positioning system (GPS) technology, to travel to meet user A at a venue, in accordance with one or more aspects of the present invention.
Figure 2C:
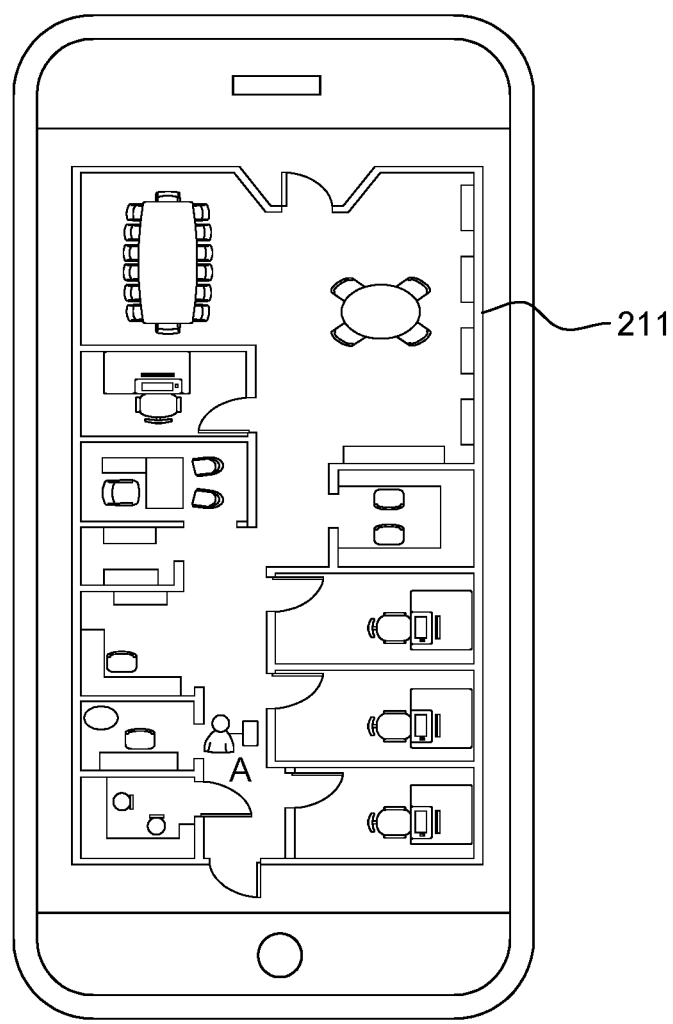
FIG. 2C depicts the mobile device of FIG. 2B after user B has crossed a geo-fence and been provided with venue-specific location data on user A's location within the venue, which in this example includes a floor plan of at least part of the venue, in accordance with one or more aspects of the present invention.

FIGS. 2A-2C depict an example of proximity-based sharing of venue-specific user location data using a locate facility, in accordance with one or more aspects of the present invention. In this example, both users are assumed to be mobile device users with, for instance, the user tracking technology implemented in association with the venue including, at least in part, mobile device tracking technology such as disclosed herein. Referring to FIG. 2A, a mobile device user A 200 and a mobile device user B 201 may initially not be located at a same venue 210. A locate facility 221, which in the example of FIG. 2A may be a cloud-based service 220, is used by mobile device user A 200 to initiate a request to mobile device user B, for instance, via user B's mobile device, to meet up with mobile device user A at or within venue 210. In this example, venue 210 is equipped with location based sensing infrastructure deployed in association with the venue. This venue based sensing infrastructure may include, for instance, BLE beacons, Wi-Fi devices, RFID technology, video camera(s), etc., configured and located to sense movement and identify location of users within venue 210. In addition to processing location and/or movement data, locate facility 221 may receive from the venue, or include, for instance, a floor plan 211 (FIG. 2C) of one or more floors of the venue 210, as well as other identifying information specific to, for instance, the venue or a particular floor of the venue, such as for example, directions for traversing a particular floor. In one or more embodiments, one or more cameras within or associated with venue 210 may also be used to record data that could be forwarded to mobile device user B as part of the venue-specific location data, if desired. Although forwarded by locate facility 221, this venue-specific location data or information may be generated within or in association with the venue, and forwarded from the venue, and more particularly, an electronic management system associated with the venue.

In the example of FIG. 2A, mobile device user B 201 may travel towards venue 210. This traveling may be facilitated by locate facility 221 providing location data, such as an address of venue 210 to mobile device user B. For instance, the location data may be sufficient for user device B to employ global positioning system (GPS) technology to display a map which includes the location of the venue where mobile device user A is located. One embodiment of this is depicted in FIG. 2B, where the mobile device of mobile device user B of FIG. 2A is shown enlarged with a display of global positioning data superimposed with a current location of mobile device user A and mobile device user B, in accordance with one or more aspects of the present invention. Note in this regard that, in one or more embodiments, mobile device user B only has general information about the venue, and does not have specific information about mobile device user A's location within the venue at this time. Thus, the amount of data and information pushed, for instance, by locate facility 221 to mobile device user B at this time remains low.

As illustrated in FIG. 2A, a geo-fence 230 may be defined, for instance, by locate facility 221, with reference to venue 210. In this example, geo-fence 230 encircles venue 210, however, in or more other examples, geo-fence 230 could simply be a line traversing an anticipated travel path of mobile device user B to mobile device user A at venue 210. In one or more other embodiments, geo-fence 230 could be located at a perimeter of venue 210, such that when mobile device user B enters the venue, locate facility 221 forwards venue-specific location data on mobile device user A's location within the venue. Note that this data may include, in one or more embodiments, a particular floor of the venue where the mobile device user A is currently located at the time that mobile device user B crosses the geo-fence. In addition, or alternatively, a floor plan or other identifying information to help mobile device user B locate mobile device user A within the venue could also be provided.

Those skilled in the art should note that, as used herein, a geo-fence crossing may refer to any specific location event required for mobile device user B to receive the venue-specific location data on the location of mobile device user A within the venue. Further, note that shared information may take a variety of forms depending on the desired implementation. For instance, in a multi-zone venue implementation, a particular zone within the venue may be identified, such as a particular department within a store, or department within an office building, etc. Further, indoor guidance technologies which provide for indoor directions may be employed. Optionally, additional metadata, such as a map or floor plan, or other information, could be shared. When sending the more precise venue-specific location data to mobile device user B, user B may be offered one or more options to select among to help guide user B to user A's location within the venue. For instance, a floor plan, photograph, video feed, internal venue directions, etc., could be offered to user B, which the user may select among. These options could be implemented and stored, for instance, in association with locate facility 221 as part of a cloud management system, such as the above-referenced IBM Presence Insights™. Further, venue-specific descriptive data, such as head to the red wall, with the green couches, could be provided to mobile device user B upon crossing the geo-fence.

FIG. 2C illustrates one example of information that may be forwarded to mobile device user B to assist mobile device user B in locating mobile device user A within the venue. In this example, a venue floor plan is forwarded to user B's mobile device to assist user B in meeting user A within the venue.

Figure 3A:
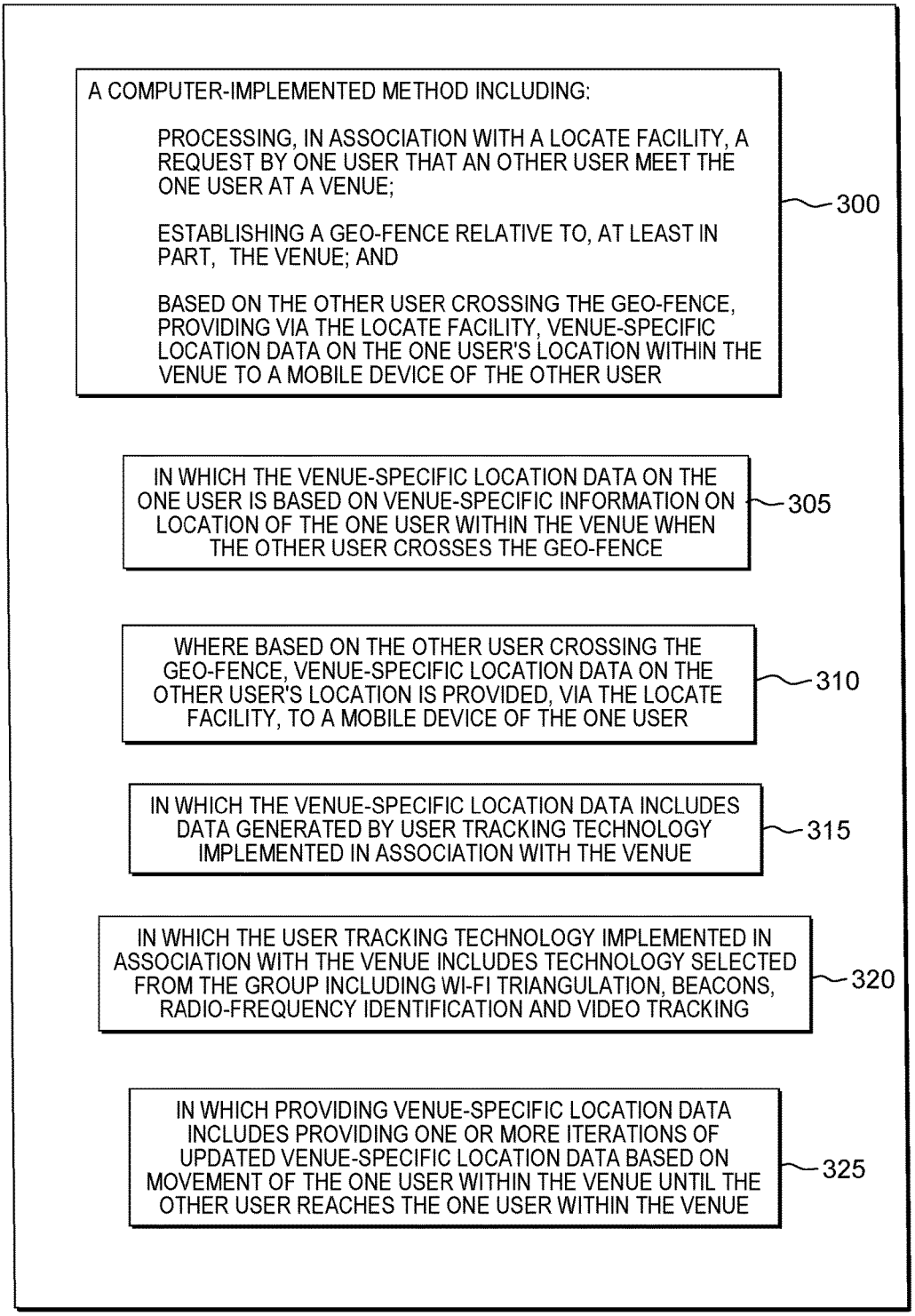
FIGS. 3A & 3B depict further details of proximity-based sharing of venue-specific user location data, in accordance with one or more aspects of present invention.
Figure 3B:
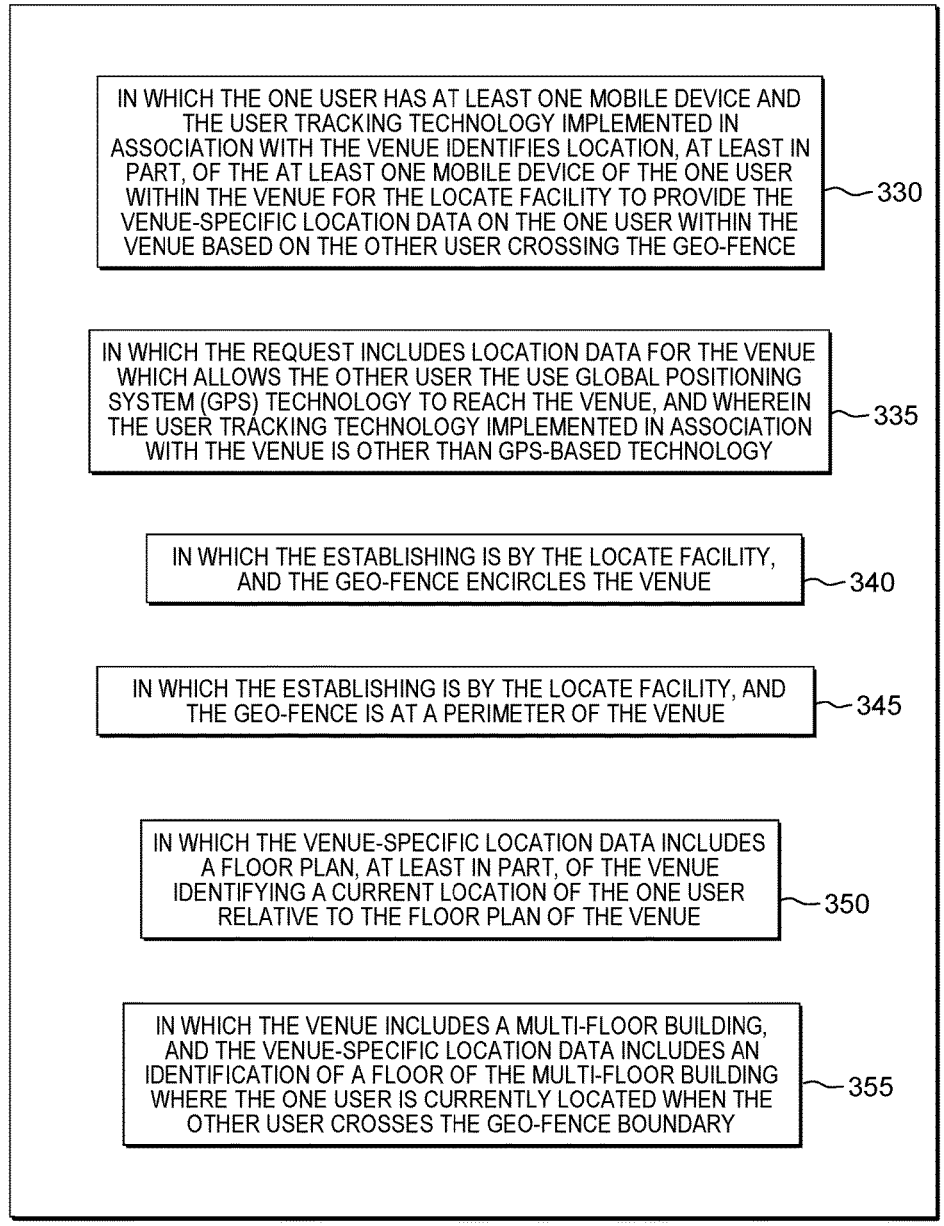

FIGS. 3A & 3B depict further details of proximity-based sharing of venue-specific user location data, in accordance with one or more aspects of the present invention. As illustrated, the method may include: processing, in association with a locate facility, a request by one user that an other user meet the one user at a venue; establishing a geo-fence relative to, at least in part, the venue; and based on the other user crossing the geo-fence, providing via the locate facility, venue-specific location data on the one user's location within the venue to a mobile device of the other user 300. In one or more implementations, the venue-specific location data on the one user may be based on venue-generated, specific information on location of the one user within the venue when the other user crosses the geo-fence 305.

In one or more implementations, based on the other user crossing the geo-fence, venue-specific location data on the other user's location may also be provided, for instance, via the locate facility, to a mobile device of the one user 310.

In one or more embodiments, the venue-specific location data may include data generated by a user-tracking technology implemented in association with the venue 315. For instance, the user-tracking technology implemented in association with the venue may include technology such as Wi-Fi triangulation, Bluetooth™ beacons, radio frequency identification, video camera tracking, etc., 320. By way of further example, providing venue-specific location data may include providing one or more iterations of updated venue-specific location data based on movement of the one user within the venue until the other user reaches the one user within the venue 325.

By way of further example, the one user may have at least one mobile device, and the tracking technology implemented in association with the venue may identify location, at least in part, of the at least one mobile device of the one user within the venue for the locate facility to provide the venue-specific location data on the one user within the venue based on the other user crossing the geo-fence 330. Further, in one or more embodiments, the request forwarded to the other user may include location data for the venue which allows the other user to use Global Position System (GPS) technology to reach the venue, and in one or more implementations, the user-tracking technology implemented in association with the venue may be other than GPS-based technology 335.

By way of example, establishing the geo-fence may be by the locate facility, and the geo-fence may be a geo-fence boundary which encircles the venue 340. More particularly, in one or more embodiments, establishing the geo-fence may be by the locate facility, and the geo-fence boundary may be at a perimeter of the venue 345.

In one or more implementations, the venue-specific location data may include a floor plan, at least in part, of the venue identifying a current location of the one user relative to the floor plan of the venue 350. Further, in one or more embodiments, the venue may include a multi-floor building, and the venue-specific location data may include an identification of a floor of the multi-floor building where the one user is currently located when the other user crosses the geo-fence 355.

Exemplary embodiments of a computing environment to implement one or more aspects of the present invention are described below with reference to FIGS. 4-6.

Figure 4:
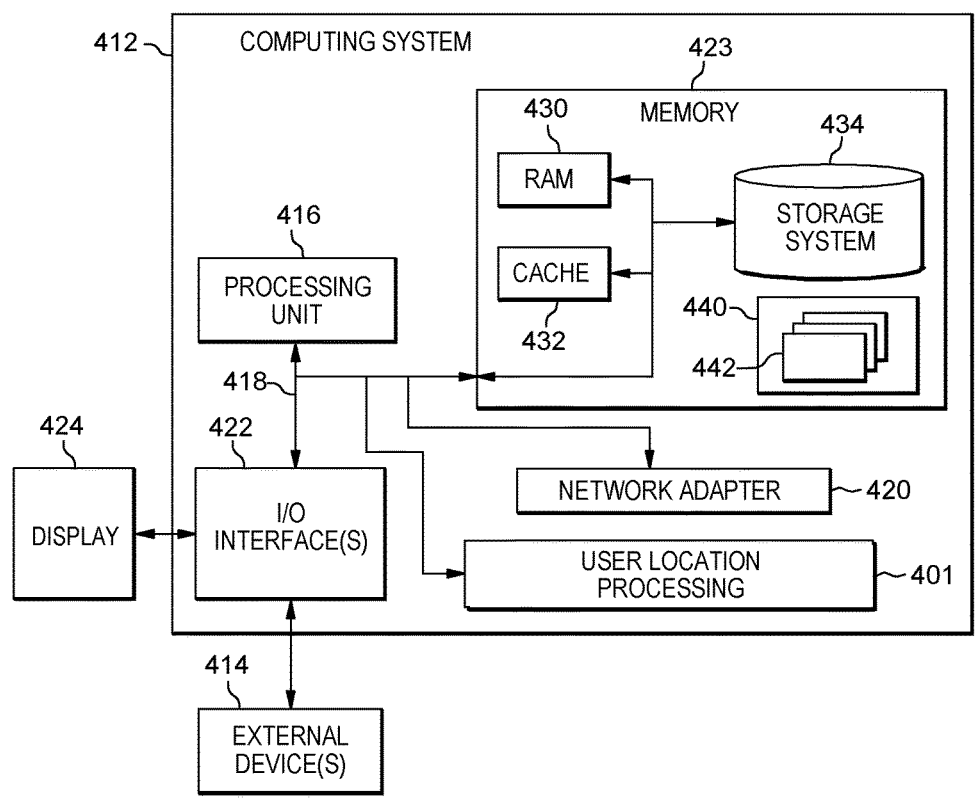
FIG. 4 depicts one embodiment of a computing system which may implement or facilitate implementing processing for proximity-based sharing of venue-specific user location data, in accordance with one or more aspects of the present invention.

By way of further example, FIG. 4 depicts one embodiment of a computing environment 400, which includes a computing system 412. Examples of well-known computing systems, environments, and/or configurations that may be suitable for use with computer system 412 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 412 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 4, computing system 412, is shown in the form of a general-purpose computing device. The components of computing system 412 may include, but are not limited to, one or more processors or processing units 416, a system memory 423, and a bus 418 that couples various system components including system memory 423 to processor 416.

In one embodiment, processor 416 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 412 may include a variety of computer system readable media. Such media may be any available media that is accessible by computing system 412, and it includes both volatile and non-volatile media, removable and non-removable media.

System memory 423 can include computer system readable media in the form of volatile memory, such as random access memory (RAM) 430 and/or cache memory 432. Computing system 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 418 by one or more data media interfaces. As described below, memory 423 may include at least one program product having a set (e.g., at least one) of program modules that are configured to carry out the functions of embodiments of the invention.

Program/utility 440, having a set (at least one) of program modules 442, may be stored in memory 432 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Alternatively, a separate, mobile device movement filtering system, module, logic, etc., 401 may be provided within computing environment 412.

Computing system 412 may also communicate with one or more external devices 414 such as a keyboard, a pointing device, a display 424, etc.; one or more devices that enable a user to interact with computing system 412; and/or any devices (e.g., network card, modem, etc.) that enable computing system 412 to communicate with one or more other computing devices. Such communication can occur via Input/Output (I/O) interfaces 422. Still yet, computing system 412 can communicate with one or more networks such as a local area network (LAN), a general wide area network (WAN), and/or a public network (e.g., the Internet) via network adapter 420. As depicted, network adapter 420 communicates with the other components of computing system, 412, via bus 418. It should be understood that although not shown, other hardware and/or software components could be used in conjunction with computing system 412. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node may include a computer system/server, such as the one depicted in FIG. 4. Computer system/server 412 of FIG. 4 may be practiced in distributed cloud computing environments where tasks are performed by remote processing devices that are linked through a communications network. In a distributed cloud computing environment, program modules may be located in both local and remote computer system storage media including memory storage devices. Computer system/server 412 is capable of being implemented and/or performing any of the functionality set forth hereinabove.

Figure 5:
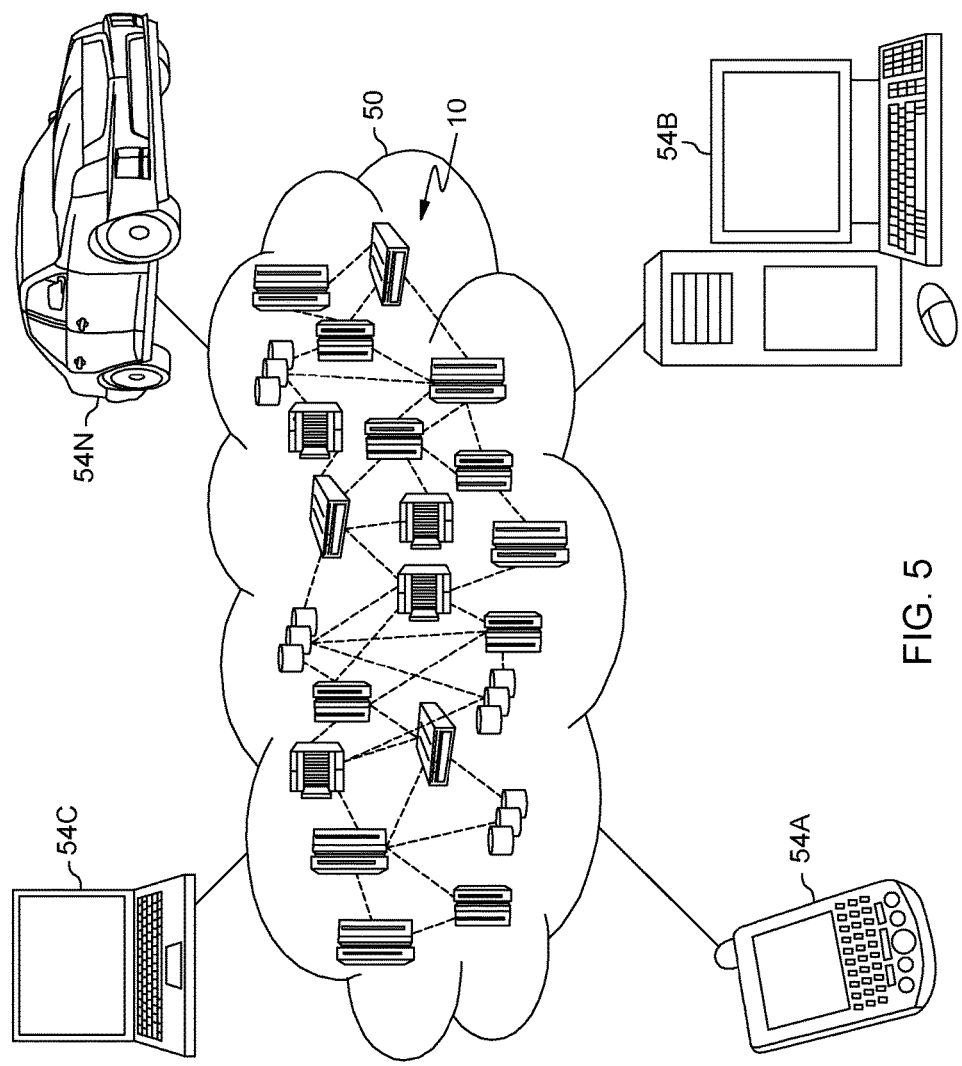
FIG. 5 depicts one embodiment of a cloud computing environment, which may facilitate implementing, or be used in association with one or more aspects of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
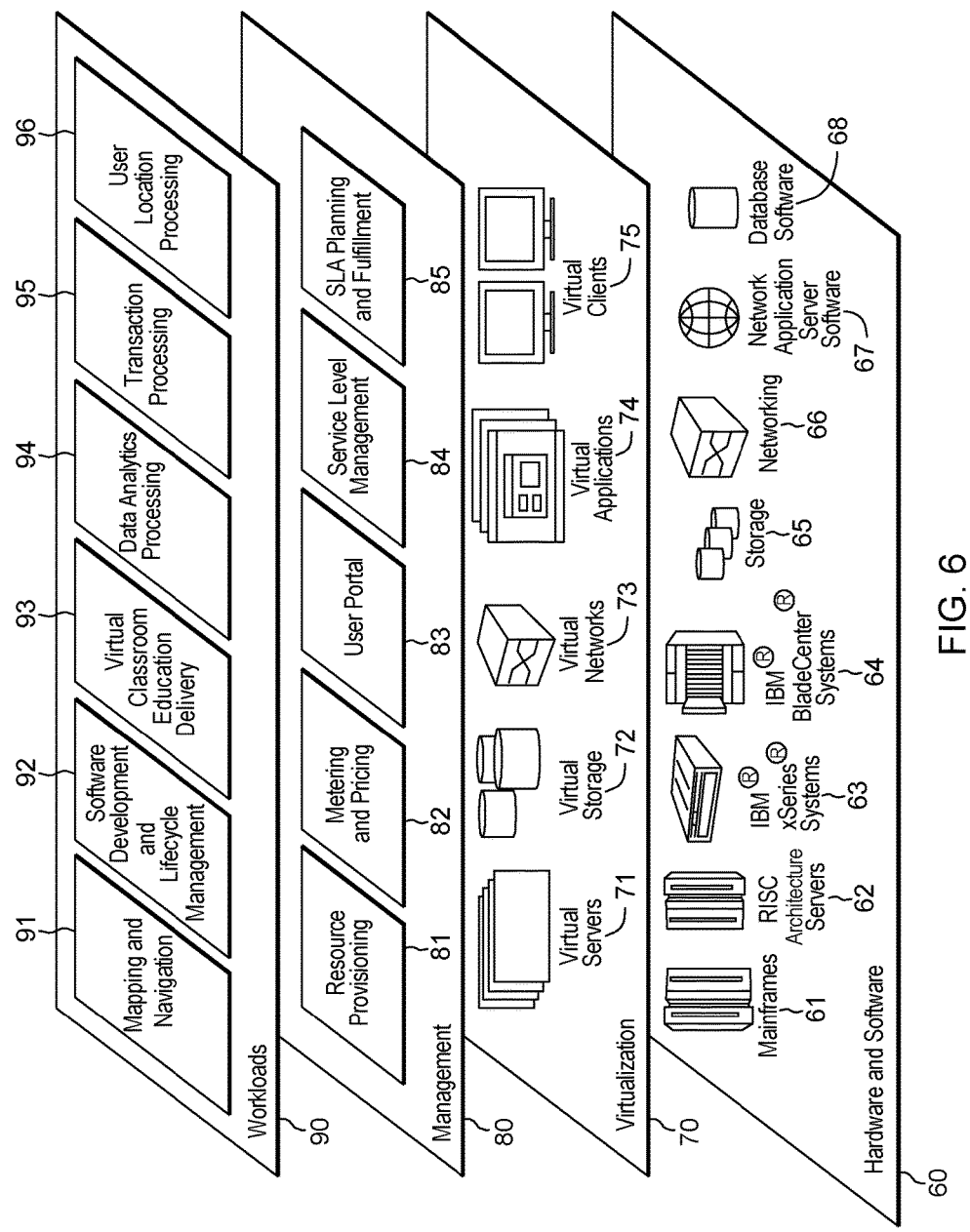
FIG. 6 depicts an example of extraction model layers, which may facilitate implementing instruction processing, in accordance with one or more aspects of the present invention.

Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user location processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
processing, in association with a locate facility, a request by a first user that a second user travel to meet up with the first user at a venue;
establishing a geo-fence relative to, at least in part, the venue;
monitoring, in association with the locate facility, location of the first user within the venue subsequent to the request by the first user that the second user travel to meet up with the first user at the venue, the monitoring occurring while the second user is traveling to the venue, and being performed by user-tracking technology implemented in association with the venue, the user-tracking technology being other than GPS-based technology; and
responsive to the second user crossing the geo-fence, automatically providing via the locate facility, venue-specific location data on the first user's current location within the venue, based on the monitoring, to a mobile device of the second user.

2. The computer-implemented method of claim 1, wherein the venue-specific location data on the first user is venue specific information on location of the first user within the venue when the second user crosses the geo-fence.

3. The computer-implemented method of claim 1, further comprising, based on the second user crossing the geo-fence, providing via the locate facility, venue-specific location data on the second user's location to a mobile device of the first user.

4. The computer-implemented method of claim 1, wherein the venue-specific location data comprises data generated by user tracking technology implemented in association with the venue.

5. The computer-implemented method of claim 4, wherein the user tracking technology implemented in association with the venue comprises technology selected from the group comprising Wi-Fi triangulation, beacons, radio-frequency identification and video tracking.

6. The computer-implemented method of claim 4, wherein providing venue-specific location data comprises providing one or more iterations of updated venue-specific location data based on movement of the first user within the venue until the second user reaches the first user within the venue.

7. The computer-implemented method of claim 4, wherein the first user has at least one mobile device and the user tracking technology implemented in association with the venue identifies location, at least in part, of the at least first mobile device of the one user within the venue for the locate facility to provide the venue-specific location data on the first user within the venue based on the second user crossing the geo-fence.

8. The computer-implemented method of claim 7, wherein the request includes location data for the venue which allows the second user to use global positioning system (GPS) technology to reach the venue.

9. The computer-implemented method of claim 1, wherein the establishing is by the locate facility, and the geo-fence encircles the venue.

10. The computer-implemented method of claim 1, wherein the venue-specific location data includes a floor plan, at least in part, of the venue identifying a current location of the first user relative to the floor plan of the venue.

11. The computer-implemented method of claim 1, wherein the venue comprises a multi-floor building, and the venue-specific location data comprises an identification of a floor of the multi-floor building where the first user is currently located when the second user crosses the geo-fence boundary.

12. A system for facilitating proximity-based sharing of venue-specific user location data comprising:
a memory; and
a processing unit communicatively coupled to the memory, wherein the system performs a method comprising:
processing, in association with a locate facility, a request by a first user that a second user travel to meet the first user at a venue;
establishing a geo-fence relative to, at least in part, the venue;
monitoring, in association with the locate facility, location of the first user within the venue subsequent to the request by the first user that the second user travel to meet up with the first user at the venue, the monitoring occurring while the second user is traveling to the venue, and being performed by user-tracking technology implemented in association with the venue, the user-tracking technology being other than GPS-based technology; and
responsive to the second user crossing the geo-fence, automatically providing via the locate facility, venue specific location data on the first user's current location within the venue, based on the monitoring, to a mobile device of the second user.

13. The system of claim 12, further comprising, based on the second user crossing the geo-fence, providing via the locate facility, venue-specific location data on the second user's location to a mobile device of the first user.

14. The system of claim 12, wherein the venue-specific location data comprises data generated by user tracking technology implemented in association with the venue.

15. The system of claim 14, wherein providing venue-specific location data comprises providing one or more iterations of updated venue-specific location data based movement of the first user within the venue until the second user reaches the first user within the venue.

16. The system of claim 14, wherein the first user has at least one mobile device and the user tracking technology implemented in association with the venue identifies location, at least in part, of the at least one mobile device of the first user within the venue for the locate facility to provide the venue-specific location data on the first user within the venue based on the second user crossing the geo-fence boundary.

17. The system of claim 16, wherein the request includes location data for the venue which allows the second user the use global positioning system technology (GPS) to reach the venue.

18. The system of claim 12, wherein the venue-specific location data includes a floor plan, at least in part, of the venue identifying a current location of the first user relative to the floor plan of the venue.

19. A computer program product for facilitating proximity-based sharing of venue-specific user location data, the computer program product comprising:
- a computer-readable storage medium having computer-readable program code embodied therewith, the computer readable program code being executable by a processor to perform a method comprising:
  - processing, in association with a locate facility, a request by a first user that a second user travel to meet the first user at a venue;
  - establishing a geo-fence relative to, at least in part, the venue;
  - monitoring, in association with the locate facility, location of the first user within the venue subsequent to the request by the first user that the second user travel to meet up with the first user at the venue, the monitoring occurring while the second user is traveling to the venue, and being performed by user-tracking technology implemented in association with the venue, the user-tracking technology being other than GPS-based technology; and
  - responsive to the second user crossing the geo-fence, automatically providing via the locate facility, venue specific location data on the first user's current location within the venue, based on the monitoring, to a mobile device of the second user.

20. The computer program product of claim 19, further comprising, based on the second user crossing the geo-fence, providing via the locate facility, venue-specific location data on the second user's location to a mobile device of the first user.

\* \* \* \* \*